United States Patent [19]
Willits et al.

[11] 3,881,102
[45] Apr. 29, 1975

[54] ELECTRO-OPTICAL SENSING APPARATUS

[75] Inventors: Samuel P. Willits; William L. Mohan, both of Barrington, Ill.

[73] Assignee: Spartanics, Ltd., Palatine, Ill.

[22] Filed: May 30, 1973

[21] Appl. No.: 365,096

Related U.S. Application Data

[63] Continuation of Ser. No. 7,372, Feb. 2, 1970, abandoned, which is a continuation-in-part of Ser. No. 311,094, Sept. 24, 1963.

[52] U.S. Cl. .............. 250/202; 356/172; 250/557
[51] Int. Cl. ........................ G05b 1/01; G05b 1/04
[58] Field of Search ................................ 250/557

[56] References Cited
UNITED STATES PATENTS 3,209,152  9/1965  Brouwer .................. 250/202
3,335,281  8/1967  Willits ..................... 356/172 X Primary Examiner—Robert Segal
Attorney, Agent, or Firm—Jacque L. Meister

[57] ABSTRACT

A periodically oscillating electro-optical scanning apparatus for indicating the position of registration lines or edges relative to itself and, when desired, to provide servo control of either the material bearing the lines or edges relative to the apparatus or the apparatus relative to the line or edge. The optical scanner is positioned relative to the material containing the indicia to eliminate output signal deficiencies. The output signal of the scanner sensing head is phase demodulated to obtain a tracking error current. This error current is combined with the oscillation reference frequency to effect displacement of the scanned area.

5 Claims, 7 Drawing Figures

SAMUEL P. WILLITS
WILLIAM L. MOHAN
INVENTORS

SAMUEL P. WILLITS
WILLIAM L. MOHAN
INVENTORS

ELECTRO-OPTICAL SENSING APPARATUS

OTHER APPLICATIONS

This is a continuation of application Ser. No. 7,372, filed Feb. 2, 1970, now abandoned, which is a continuation-in-part of the application of Samuel P. Willits, Ser. No. 311,094, filed Sept. 24, 1963, titled "Electro-Optical Sensing Apparatus".

BACKGROUND OF THE INVENTION

The field of the invention is generally related to improvements in apparatus for automatically positioning registration marks or indicia and, more particularly, to an electro-optical sensing apparatus having outputs either useful for positioning the apparatus or elements associated therewith relative to the registration indicia or for providing indications of the excursion thereof.

In the aforementioned co-pending application of Samuel P. Willits, an apparatus is described which is responsive to registration indicia having line-like width characteristics relative to the effective width of the active electro-optical elements of the sensing head. In that apparatus the electrical signal output of a cyclically scanning sensing head was amplified and filtered to provide a control signal for a servo positioning device which mechanically repositioned the line-like registration indicia into a preselected alignment with the sensing head and, with this alignment was perfected, generated an auxiliary control signal indicative of satisfactory completion of the repositioning. The auxiliary control signal typically would be used for initiating a further operation of an associated machine such as tripping of a shear blade, actuation of a ram, etc.

A particular feature of the Willits application is a special angular relationship of the material and indicia to the scan direction and light source. This special relationship has several advantages including elimination or reduction of errors caused by parallax and shadow effects or signal polarity reversals during a scan. In some embodiments, novel image offsetting means are used to advantage.

Various other devices are known for indicating the position of a line-like registration indicia and for servopositioning in response thereto. In some of these there is no movement of the scanning element and detection requires the movement of the registration indicia past the elements to evoke a signal. A device typical of this type is disclosed by J. C. Frommer in U.S. Pat. No. 2,840,371 issued June 24, 1958. Frommer's device provides repositioning of plural indicia upon a moving strip relative to his sensor and thus maintains registration during continuous feed color printing operations.

In other known devices there is movement of the scanning elements making movement of the indicia an unnecessary prerequisite to detection. Devices typical of this type are described by M. A. McLennan in U.S. Pat. No. 2,489,305, issued Nov. 29, 1949, and W. P. Frantz in U.S. Pat. No. 2,892,948, issued June 30, 1959. The Frantz device however, unlike the others, requires the presence of two registration indicia to enable it to provide a suitable servo output signal.

Included in the prior art is the disclosure of H. R. Summerhays, Jr. in U.S. Pat. No. 2,674,917, issued Apr. 13, 1954. Summerhays discloses a non-contacting electro-optical width gauge incorporating fixed prisms and mirrors, wieldable independently of the prisms, to effect a scan of the edge of strip material moving beneath the prisms and mirrors. No apparatus is disclosed for any automatic repositioning, the device providing only meter indications of strip width variations.

From the foregoing brief discussion of prior art devices taken in conjunction with their complete disclosures, it can be seen that the prior art makes no provision for eliminating parallax errors due to positioning of the electro-optical sensor relative to the registration indicia nor is there provision for eliminating shadow effects such as occur when the indicia is either depressed below or elevated above the surface bearing it. Further, there is no provision for relocating the scanned area in accordance with displacement of the indicia such as might be desirable in following high speed transient variations in indicia location. The inability of the prior art to overcome parallax errors or shadow effects as well as its inability to automatically shift the scanned area in accord with indicia location transients, are overcome by the present invention.

SUMMARY OF INVENTION

A principal object of the invention is the elimination of parallax errors, shadow effects and polarity reversals in the output signals of a periodically oscillating electro-optical scanning apparatus. This object is realized by maintaining a scanning radiation source and oscillating scanning sensor in a special angular relationship to each other and a registration indicia and the material upon which the indicia is located.

Still another object of the invention is to provide new and improved electro-optical sensing apparatus having wieldable optical means for physically offsetting the image of the scanned registration indicia a fixed distance from a plane containing the optical axes of the source of scanning radiation and the scanning sensor. This object is achieved by placing two reflecting surfaces, which desirably are supplied by a rhomboid prism, in the optical paths between the indicia and combination of sensor and light source.

Yet another object of the invention is to provide new and improved electro-optical scanning apparatus having provisions for mechanically centering the fixed amplitude scan over the registration indicia in response to excursions thereof. This object is achieved by forming a scan error signal from the scanner sensor output and using this scan error signal in a multiplex arrangement to effect an excursion of the center of scan identical to that of the registration indicia relative thereto and thereby maintain the center of scan aligned with the indicia.

The foregoing and other objects of the invention are achieved by a novel electro-optical sensing head which produces electrical signals having characteristics related to the relative position of the registration indicia or mark. The electrical signal output of the sensing head is amplified, filtered, and phase demodulated to provide a control signal for a servo positioning device which either mechanically repositions the registration indicia into a selected alignment with the sensing head or mechanically repositions the sensing head into alignment with the indicia or, by electrical combining techniques, repositions the center of scan to a selected alignment with the indicia or provide a combination of these corrections. The nature of the invention and its several features and objects will appear more fully from the following description made in connection with the accompanying drawings.

DESCRIPTION OF INVENTION

Figure 1:
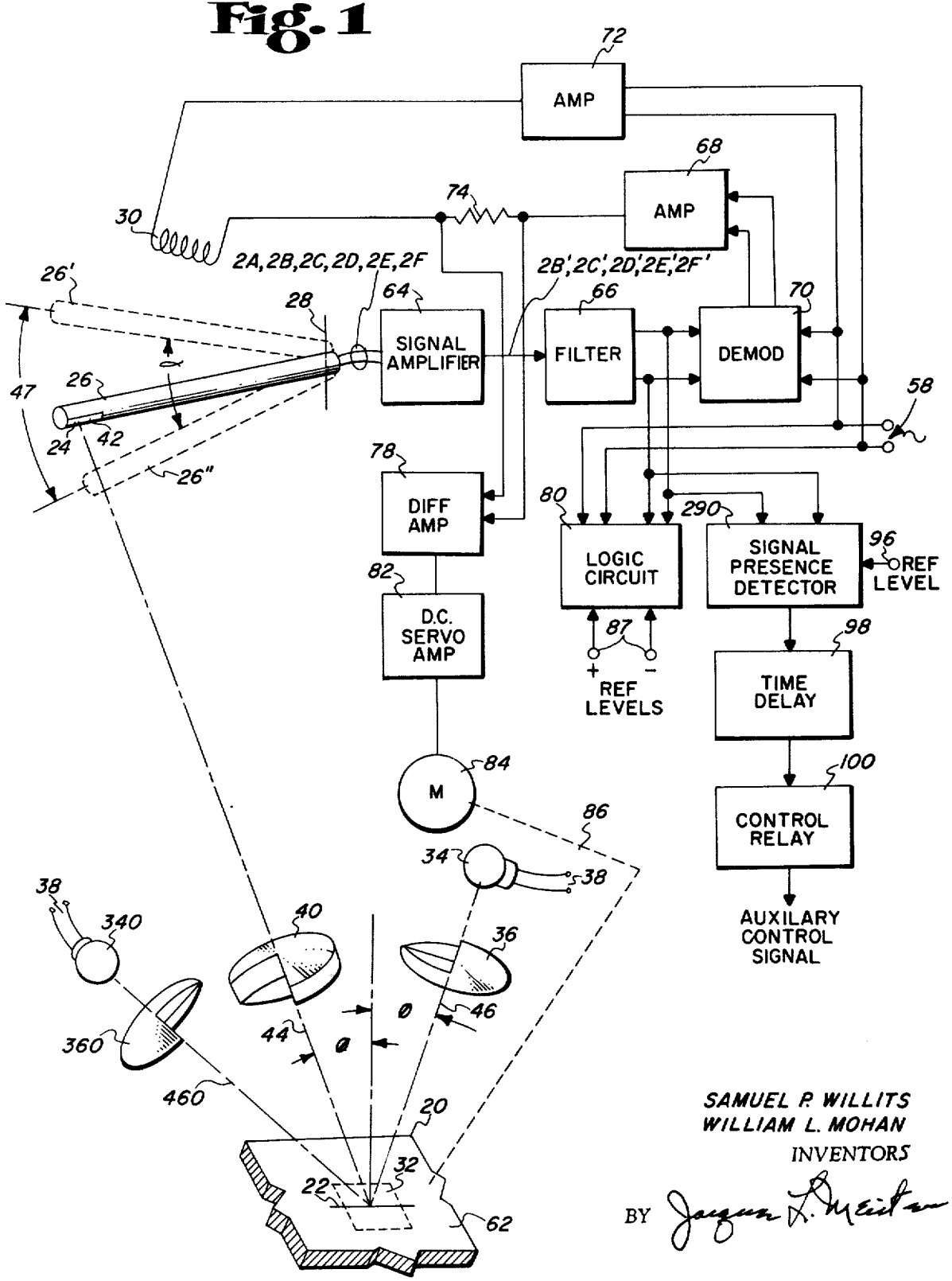
FIG. 1 is a combination mechanical schematic-electrical block diagram of the principal elements of the invention.

The present invention utilizes elements of the aforementioned Willits application and is designed to enhance the operation of the apparatus described therein by enabling faster servo response over an extended scan area. Accordingly, FIG. 1 illustrates in simplified schematic form the principal elements of the Willits sensing apparatus as modified for this invention. There, material 20, bearing a suitable registration mark 22 is positioned to be within the field of view of a photo detector 24 mounted on an oscillating arm 26. Arm 26 is oscillated about pivot axis 28 through an angle α between the two fixed positions indicated in phantom outline at 26' and 26'' by a conventional moving coil type of electro-mechanical drive schematically indicated by arm drive coil 30. Coil 30 is excited by an amplified AC reference signal applied at terminal 58 and by an amplifier 68 whose operation is explained below. The combination of oscillation and the physical size of the active area of detector 24, results in a scanned area indicated at 32.

A light source 34 is focused by condensing lens 36 on scanned area 32 to provide illumination for detector 24. Suitable aperture stops (not illustrated) may be used in some instances to restrict the light from source 34 to scan area 32 or nearly so although such stops are not essential to the invention. The only requirement in this regard is the prevention of direct irradiation of detector 24 by source 34. Light source 34 is excited by a DC source 38 to insure no AC signal components will be generated by detector 24 by any rapid variations in intensity of the source. Use of such a DC excited light source has proven advantageous as will become apparent later in this description.

An image of the active scanning area 32 is formed by objective lens 40 in or substantially in the plane of movement of oscillating arm 26 and specifically in the plane of an aperture mask 42 positioned on that arm in front of detector 24. To provide an enhanced signal amplitude and an averaging effect to overcome any problem created by any variations in line width or smoothness, the shape of the aperture in mask 42 has been made long and narrow with the major axis of the aperture positioned parallel to the axis of scan arm 26. Detector 24 is positioned relative to the aperture in mask 42 so that only light passing through the aperture from lens 40 can fall on the detector's sensitive surface. In this manner the aperture in mask 42 defined the active area of detector 24. In the majority of embodiments constructed, the detector employed has been a silicon photovoltaic cell. This particular type of cell was chosen for its small size, logarithmic saturation characteristics and low impendance which matches the transistorized signal processing circuitry employed. Obviously, however, other types of cells may be employed depending on operating parameters.

In operation, oscillating arm 26 oscillates through a small angle α about axis 28 in a plane perpendicular to the optical axis 44 of lens 40. While the absolute scan amplitude 47 plus the width of the aperture in mask 42 is necessarily greater than the imagined width of registration mark 22, the showing of FIG. 1 has been exaggerated for illustration purposes. More nearly to scale is the illustration of FIG. 3 discussed further below. The elements of the scanning head are so arranged that this oscillation of arm 26 periodically translates aperture mask 42 and detector 24 across the image of active sensing area 32 in a direction substantially perpendicular to the long axis of the image of registration mark 22. Thus, at any instant, the light falling on detector 24 through the aperture in mask 42 is a measure of the brightness of the particular part of the image of the active sensing area visible through the aperture in the mask. The resulting electrical output of detector 24 is thus proportional to the brightness of a particular part of the image of active sensing area 32 falling at any instant on the aperture in the mask 42.

Figure 2:
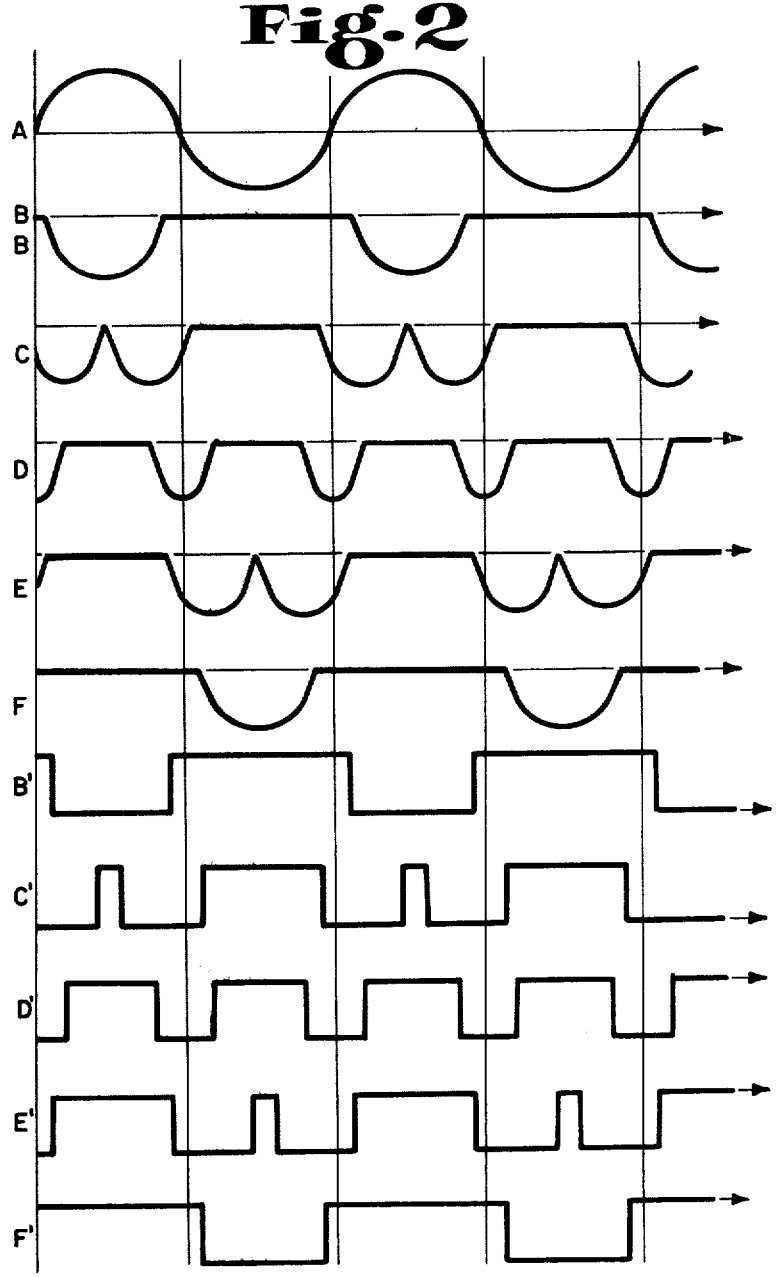
FIG. 2 is a waveform diagram illustrating output waveforms from the inventive sensing head for the various positions of the registration indicia relative thereto illustrated in FIG. 3 and of the waveforms appearing at the indicated point in the circuitry of FIG. 1.
Figure 3:
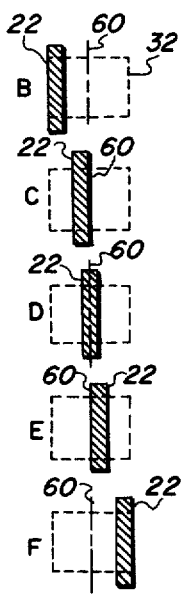
FIGS. 3B through 3F illustrate various positions of a registration mark sensed by the invention relative to the active scanning area of the invention.

The signal outputs of detector 24 for various positions of registration mark 22 relative thereto are discussed in conjunction with FIGS. 2 and 3. However, before continuing with a description of these signals and of the signal processing circuitry, a description and understanding of other characteristics of the scanning head of the invention will aid in understanding the detector signal outputs and processing circuitry.

In certain applications, the material 20 bearing the registration marks 22 has a highly polished surface. In such an instance, the specular reflections from the polished surface contain a very high percentage of the total light reflected from that surface. Additionally, depending on the angle of the optical axis 46 of lens 36 relative to the polished surface and the angle of optical axis 44 relative thereto, the image of the registration mark will appear either light or dark regardless of its absolute contrast relative thereto. Obviously this can present problems of signal polarity as the material 20 is positioned. To provide consistent polarity of the detector signal in the face of such a condition and to enhance signal levels and reduce spurious signals, it has been found desirable to have the optical system, including the surface of material 20 in a particular optical alignment that also maximizes specular reflections. I have found that this particular optical alignment can be achieved by arranging optical axes 44 and 46 in such a manner as to cause them to intersect each other at or very near the surface of material 20, by having axes 44 and 46 and a line 48 positioned between the axes in the same plane, and by further arranging the axes 44 and 46 relative to line 48 so that the angles Φ formed between each axis and that line are equal.

Another type of material variation that can affect the accuracy of scanner type sensing apparatus of the type employed in my invention, occurs when the distance from the sensing head to the registration mark varies. This distance variation most frequently is caused by material thickness changes, but also may be caused by raised or depressed registration indicia 22 causing shadow effects. Either material thickness variations or shadow effects would ordinarily cause errors in measurement of indicia location which errors can result in positional errors of the work piece 20 relative to the desired reference position. It is an advantageous feature of my invention that these positional errors caused by parallax or shadow effects are eliminated by a particular geometrical arrangement of the entire illuminating, imaging and scanning system. The particular geometrical arrangement used operatively places these elements in a plane that contains the axis of the registration indicia and that is mutually perpendicular to both the scanning direction and the surface of the material 20 being registered. Such an arrangement is shown in FIG. 1.

Still another type of variation in indicia contrast characteristics relative to the uniform background 62, occurs when both the indicia and the background have substantially identical reflectance characteristics and both scatter incident light. In such an instance, the lambertian illumination has a significantly higher signal to noise ratio than the specular. Such characteristics are frequently encountered when background 62 and indicia 22 are both painted, even when their colors are contrasting. It is a feature of the invention that when this contrast characteristic is encountered, lambertian illumination of photo-detector 24 can be substituted for specular while still maintaining the scanning systems freedom from parallax errors. An arrangement to effect this is shown in FIG. 1.

The illumination substitution is achieved by switching off light source 34 and switching on light source 340. Light source 340 is focused by condensing lens 360 on scanned area 32. Substantially the identical precautions described above regarding stray light and DC source are taken with respect to source 340 as are taken with respect to source 34. However, the optical axis 460 of lens 360 is inclined with respect to scanner optical axis 44 either as shown on the side opposite from axis 46 or, at any other skew angle with respect to axis 44 that results in maximum lambertian illumination of photodetector 24. No matter how placed for maximum lambertian illumination, axes 44 and 460 are retained in the same plane common to axes 44 and 46 and registration indicia 22 and that plane is mutually perpendicular to both the scanning direction and the surface of the material 20 being registered.

Figure 6:
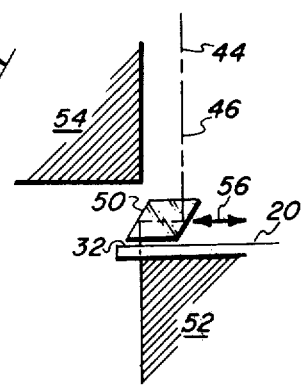
FIG. 6 is a partial mechanical-optical schematic of an embodiment of the sensing head of the invention showing the method of achieving an offset optical path.

In many applications of my automatic sensing apparatus mechanical interference with machine elements physically prevents achieving the above set forth requirement for operating the active elements of the sensing head in a single plane which includes the registration mark. To overcome this difficulty and retain the advantages of operating the elements of the sensing head in a single plane, we provide an optical offset achieved by the insertion of a rhomboid prism into the optical system near or adjacent to the surface bearing the registration mark. This arrangement is illustrated in FIG. 6 where rhomboid prism 50 is shown positioned adjacent active scanning area 32 and material 20 to provide the desired offset in optical axes 44 and 46 relative to fixed shear blade 52 and movable shear blade 54. As will be apparent to those versed in the optical arts, reflectors and other optical elements can be used to obtain optical offsets in place of the illustrated rhomboid prisms and such elements are employed when the optical path is modified to reduce its height. However, a special feature of a rhomboid prism is that optical systems employing such a prism are relatively insensitive to small positional changes of the prism relative to the sensing head.

In certain applications of my automatic sensing apparatus, some mechanical part or machine element, such as a shear blade, must be moved through the space occupied by the optical system of the invention. It is a special feature of the invention that such movements of machine elements can be effected without resultant damage to the optical system. This advantageous result is obtained by utilizing a wieldable rhomboid prism in the inventive optical system. Because of the properties of the rhomboid prism, the prism can be reciprocally displaced in the directions of double ended arrow 56 during the shear cycle and any small positional changes in prism location relative to the optical axes 44 and 46 that occur when the prism is returned to normal operating position after displacement do not result in any error in location of the reference position on subsequent cycles. As will become apparent from description which follows, prism 50, when necessary, may be moved to clear a moving machine element when an output signal which actuates the shear is developed in the circuitry of the invention. The apparatus to move prism 50 has not been illustrated since it is conventional in nature and forms no part of my invention. However, one mechanism successfully employed for this purpose consisted solely of a solenoid actuated bell-crank to which prism 50 was cemented. Other mechanisms may be employed as well depending largely on the type of machine tool with which my inventive apparatus is associated.

FIGS. 2B through 2F illustrate the output waveforms of detector 24 for the various positions of the registration mark 22 illustrated at the correspondingly lettered sub-figure of FIG. 3. In FIG. 2, time increases from left to right. FIG. 2A illustrates the time varying position of oscillating arm 26. Because of the very low inertia of arm 26, wavetrain 2A may also be considered to be identical or nearly identical with the AC reference voltage supplied to the system circuitry at terminal 58.

When registration mark 22 is displaced from the center 60 of the scanning area 32 to a position to the left and near one edge thereof as shown in FIG. 3B, the output signal of detector 24 is shown in FIG. 2B. The flat top or straight line portion of the wavetrain occurs when the detector scans the image of the uniform background 62 of material 20 adjacent mark 22. The negative going loop occurs once each cycle as the detector cyclically moves into and out of the image of the registration mark. Note that in this and the following examples, the reference position with respect to which registration mark 22 is positioned, has been assumed to be the center 60 of the active scanning area 32. Other reference positions, offset as desired from the position of this example, could be employed. However, normally the reference position is located at the center of the active scan area.

If the registration mark is then positioned nearer to the center 60 of active scanning area 32 as shown in FIG. 3C, detector output is as shown in FIG. 2C. There again the straight line portion of the wavetrain occurs when the detector does not "see" the registration mark and only sees the uniform background area 62 of material 20. The double negative going loop is generated as the detector cyclically scans back and forth through the image of the registration mark 22. Note that when compared with FIG. 2B the duration of the scan through the image of the mark 22 has increased relative to the duration of the scan of the uniform background area 62 and that the two scan durations have almost become equal.

When the registration mark 22 is positioned at the center 60 of the active scanning area as illustrated in FIG. 3D, the output wavetrain of detector 24 is as illustrated in FIG. 2D. Two complete cycles each consisting of a negative going loop and a straight line portion appear in the output wavetrain for each scan cycle with identical waveforms generated on each side of the scan cycle. The output wavetrain is, for this position of the mark, composed only of even harmonics of the frequency of displacement of oscillating arm 26 with no fundamental component. Thus, the output wavetrain comprises a signal whose component frequencies, other than the constant term, are all even harmonics of the frequency of FIG. 2A.

If the registration mark 22 is moved to the right of center 60 of scanning area 32 as shown in FIG. 3E, the output wavetrain of detector 24 is as illustrated in FIG. 2E. A move of the work further to the right as shown in FIG. 3F results in output wavetrain 2F. By inspection of FIGS. 2B through 2F, it can be seen that as the registration mark 22 is displaced one way or the other from the center 60 of scanning area 32, the fundamental component in the output wavetrain appears. Further, as the displacement of the mark from center increases, the fundamental component increases in amplitude with its phase determined by the direction of displacement from center 60. Displacement of the mark one way produces a fundamental component in phase with the wavetrain of FIG. 2A and displacement in the other direction produces a fundamental component in phase with the wavetrain of FIG. 2A and displacement in the other direction produces a fundamental component 180° out of phase with that wavetrain. Thus, the characteristics of the fundamental contained in the output wavetrain are exactly those required to provide a servo control signal indicative of the position of registration mark 22. The means by which I convert these characteristics of the detector signal are illustrated schematically in FIG. 1.

The output signal from detector 24 is amplified in signal amplifier 64. Signal amplifier 64 is a cascaded grounded emitter transistor amplifier whose final stages are operated saturated to maintain a comparatively uniform servo loop gain over large ranges of signal level from detector 24. The output signals of amplifier 64 corresponding to its input signals 2B, 2C, 2D, 2E and 2F, are also illustrated in FIG. 2 as signals B', C', D', E' and F' respectively. The manner of achieving these characteristics of signal amplifier 64 and the reason therefore are explained in detail in the aforementioned Willits application. The amplified output of signal amplifier 64 is processed by low-Q tuned filter 66 which passes the fundamental frequency contained therein and reduces the amplitude of any higher harmonics present.

It is a feature of the invention that high speed transients in the location of indicia 22 can be "tracked" by the scanner mechanism which relocates the scanned area in accord with relocation of the indicia. The tracking is accomplished by shifting the scanned area to maintain it substantially centered about the indicia 22 as shown in FIG. 3D. Thus, the scanned area is shifted as shown in FIG. 4.

Figure 4:
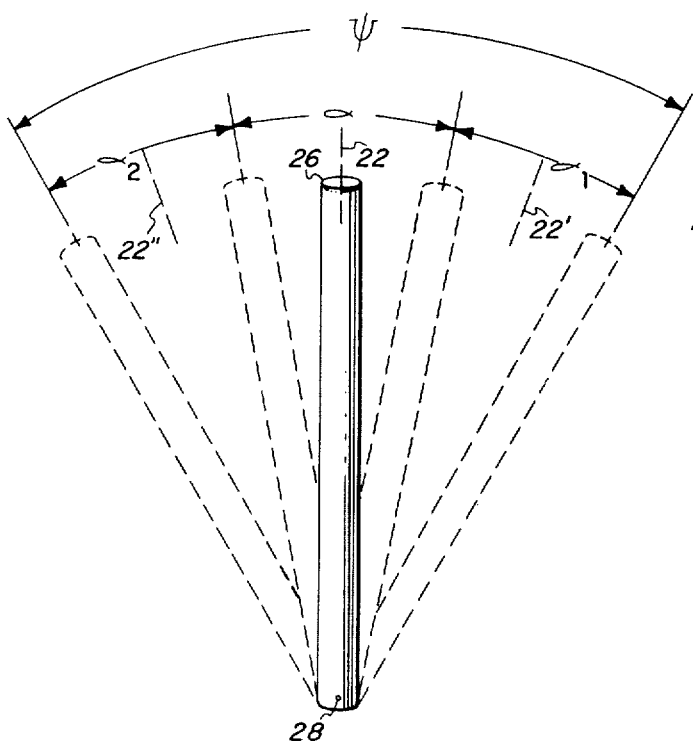
FIG. 4 illustrates various angular excursions of the center of scan as occurs in one embodiment of the invention.

In FIG. 4, the normal angular excursions of oscillating arm 26 about indicia 22 are indicated by $\alpha$. When the indicia is moved to the right to the position indicated as 22', the center of scan follows the movement and the angular excursions about 22' are indicated as $\alpha_1$. A similar movement to the left to position 22'' results in a scanning angle $\alpha_{2\,2}$. In all instances shown and for any intermediate shifts in position, the scanning angles $\alpha, \alpha_{,1}, \alpha_{2\,2}$, etc., remain equal so long as the total angular excursion is within the mechanical constraints of the oscillating system.

This tracking of the shifting locations of indicia 22 by the scanner mechanism is achieved by combining the normal scanner input drive frequency of arm drive coil 30 with a scan error signal derived from the scanner sensor output. The scan error signal is derived from the output of filter 66 by a conventional phase sensitive demodulator 70 whose reference frequency is source 58. The output of demodulator 70 is a DC voltage whose amplitude and polarity are proportional to the amplitude and phase of the fundamental components of the oscillation frequency present in the output of detector 24 and hence, is proportional to the magnitude and direction of the displacement of indicia 22 from the center of scan 60.

The scan error signal is amplified in a low impedance DC amplifier 68 and applied to the drive coil 30 of scan arm 26 as a current developed across resistor 74. Drive coil 30 is in turn connected to AC source 58 through a low impedance DC amplifier 72. For economy of fabrication, both amplifiers 68 and 72 are identical, their principal required characteristics being a low output impedance and low drift to minimize errors in tracking of indicia 22. Since coil 30 is essentially a current device with deflections substantially linear with current, the resistance R of resistor 74 is maintained very much lower than that of coil 30 to minimize its effect on arm deflection.

While displacement of the scanned area enables the inventive apparatus to effect tracking of high speed transients in indicia location, necessarily the overall displacement $\psi$ is limited by the electrical and mechanical-optical constraints imposed upon the oscillating scanning system. Accordingly, when a sensing apparatus is required to track large amplitude excursions of the registration indicia, supplemental or substituted means for tracking the indicia are also required. It is a feature of the invention that the scan error signal current developed across resistance 74 can be used to drive a supplemental servo system to effect the large amplitude tracking. It is a further feature of the invention that this supplemental servo system can either be operated with scanner tracking of the indicia or as a substitute for such tracking.

The supplemental servo means of the invention comprises a conventional differential amplifier 78 connected across resistor 74 to measure the current flowing therethrough. As explained above, the instantaneous current through resistor 74 is proportional to the displacement of the indicia 22 from the center of scan 60.

The error signal current as determined by differential amplifier 78 is then applied to DC servo power amplifier 82 whose output is connected to DC servo motor 84. The servo loop back to registration indicia 22 is closed by providing a mechanical link between the output shaft of servo motor 84 and material 20 or between the shaft and the sensing head in case it is desirable to follow the position of the indicia instead of correcting it. This link is schematically indicated as 86 in FIG. 1. The link 86 may be, for example, a driving roller, a driven gage bar or pin against which the material is held or a conveyor on which the material rests.

The amplifiers 78 and 82 and motor 84 are all of conventional design and hence, are not described further herein. Motor 84 is shown as operating without any velocity feedback stabilization as may, of course, be desirable in certain systems — particularly those having short time constants. Further, when servo motor 84 is operated as a supplement to scanner tracking of indicia excursions, it is both desirable and necessary that the time constant of the servo system be considerably longer than that of the scanner tracking system to enable maintenance of a stable overall composite tracking system.

The modified and extended Willits apparatus of this invention also includes position analyzing circuits capable of generating an auxiliary control signal whenever positioning of a registration mark has been satisfactorily accomplished. These circuits are described in detail in the Willits application and comprise a logic circuit 80 and a signal presence detector 290. These two circuits together analyze the output signal of the power amplifier 68 in terms of voltage references supplied at terminals 87 and 96 and initiate the auxiliary control signal formed by control relay 100 after the passage of time occasioned by time delay 98. Time delay 98 insures that the auxiliary control signal will not be initiated prematurely as it otherwise might under condition of servo motor over or undershoot.

Figure 5:
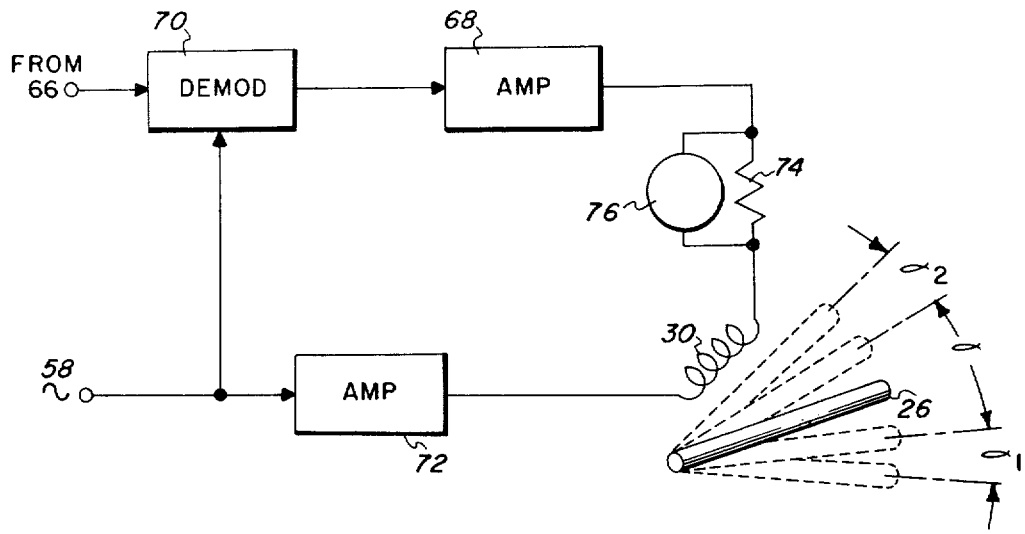
FIG. 5 illustrates an alternative embodiment of the invention employing meter indications of the shifting locations of a registration indicia relative to the center of scan.

The foregoing description has been of a system that mechanically tracks excursions of the indicia 22 to maintain it centered in the scanned area by repositioning of the indicia 22. However, in some instances, it is not necessary to track indicia excursions, it merely being necessary to determine the amount thereof. In such instances, the supplemental servo positioning system shown in FIG. 1 can be dispensed with and a meter or other indicator substituted therefore. Such an alternative embodiment of the invention is shown schematically in block diagram form in FIG. 5. In FIG. 5 the output of the photodetector 24 contained in oscillating arm 26 is assumed to be processed by circuitry essentially the same as that in FIG. 1 and terminating in phase sensitive demodulator 70, amplifiers 68 and 72 and resistor 74. However, instead of connecting a supplemental servo system across resistor 74, there is connected a meter 76. Meter 76 is thereby enabled to indicate the error currents developed across resistor 74.

Figure 7:
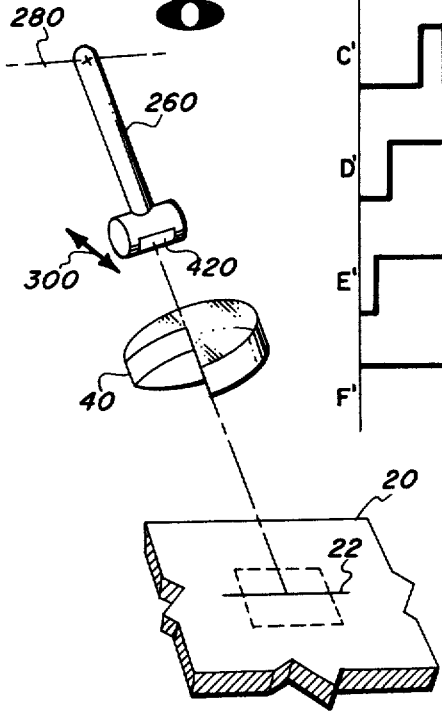
FIG. 7 is a mechanical schematic illustrating an alternative arrangement of the sensing apparatus of the invention.

Another embodiment of the inventive sensing apparatus is shown in FIG. 7. In the FIG. 7 apparatus, the arm 260 rotates about axis 280 to cause oscillation of aperture 420 to and fro in the direction of double ended arrow 500. Since aperture 420 is oriented with respect to indicia 22 in exactly the same manner as in FIG. 1 or 4 but the oscillation is about axis 280 instead of an axis 28 at right angles thereto, objectionable rotation of the scanning aperture relative to the indicia 22 is eliminated. This objectionable rotation occurs with the apparatus of FIGS. 1 or 4 where it becomes significant for large angles $\psi$.

While certain specific examples of the invention have been disclosed, it will be understood that further variations and modifications could be made in the system that are within the spirit and scope of the invention as described herein.

We claim:

1. In scanning servo apparatus for sensing the location of an irradiated registration mark relative to the sensor system optical axis of said apparatus to provide an output error signal indicative of said location thereof and for relocating the center of scan of the sensor of said servo apparatus relative to said sensor system optical axis and thereby to the image of said mark in response to said error signals, said scanning servo apparatus including drive coil means, scanning means and signal processing means, said drive coil means being connected to a source of AC power to effect the cyclical oscillation of said scanning means at a fixed amplitude in a direction normal to said registration mark's longitudinal axis and thereby define a scanned area particularly positioned with respect to said optical axis, said scanning means including a sensor means having signal outputs representative of the location of said registration mark with respect to said scanned area, said signal processing means including amplifier means and fundamental enhancing filter means connected and responsive to the output of said sensor means, said optical axis being defined by and passing through the center of an objective lens and the center of said sensor with said drive coil means unenergized, the improvement comprising the combination of Phase demodulator means connected to both said fundamental enhancing filter means and to said AC source and responsive thereto for generating output DC servo error signals indicative of the departure of the center of said scanned area from the image of said mark, and combining means comprising said drive coil means and first and second DC amplifier means, said means being connected through said first DC amplifier means to said AC power source and through said second DC amplifier means to said phase demodulator means and responsive to the combination of said output DC servo error signals and said AC power source to simultaneously effect said cylical oscillation and a tracking compensating relocation of the center of said scanned area relative to said sensor system optical axis and toward said image of said registration mark.

2. The improvement of sensor apparatus in accord with claim 1 further comprising supplemental servo means connected and responsive to the output of said DC amplifier means for effecting compensating relocations of the material having said mark thereon to maintain it in a predetermined position relative to said optical axis, said supplemental servo means comprising amplifier means 78 connected and responsive to the output of said DC amplifier means to generate supplemental DC servo error signals indicative of the departure of said registration mark from said optical axis, DC servo power amplifier means 82 connected to the output of said amplifier means for amplifying said supplemental DC servo error signal, servo motor means 84 connected and responsive to the amplified output of said servo power amplifier means, and linking means 86 connecting the output of said servo motor means and said material thereby to effect said compensating relocations of said material and said registration mark toward said predetermined position relative to said optical axis, said supplemental servo means having a time constant substantially longer than that of said tracking compensating relocations.

3. The improvement of servo apparatus in accord with claim 1 further comprising supplemental servo means connected and responsive to the output of said DC amplifier means for effecting compensating relocations of said sensing head means to maintain said optical axis in a predetermined position relative to said registration mark, said supplemental servo means comprising amplifier means 78 connected and responsive to the output of said DC amplifier means to generate supplemental DC servo error signals indicative of the departure of said registration mark from said optical axis, DC servo power amplifier means 82 connected to the output of said amplifier means for amplifying said supplemental DC servo error signal, servo motor means 84 connected and responsive to the amplified output of said servo power amplifier means, and linking means 86 connecting the output of said servo motor means and said scanning means thereby to effect said compensating relocations of said sensing head means toward said predetermined position relative to said registration mark.

4. The improvement of servo apparatus in accord with claim 1 further comprising meter means connected and responsive to the output of said combining means for indicating the excursion of the registration mark from said sensor system optical axis.

5. The improvement of servo apparatus in accord with claim 1 wherein said cyclical oscillation of said scanning means is about an axis located in a plane containing the axis of said registration mark, said plane being substantially perpendicular to the surface upon which said registration mark is located.

* * * * *